Nov. 21, 1950
L. C. ATWOOD ET AL
BICYCLE STABILIZER
Filed May 7, 1949
2,530,498
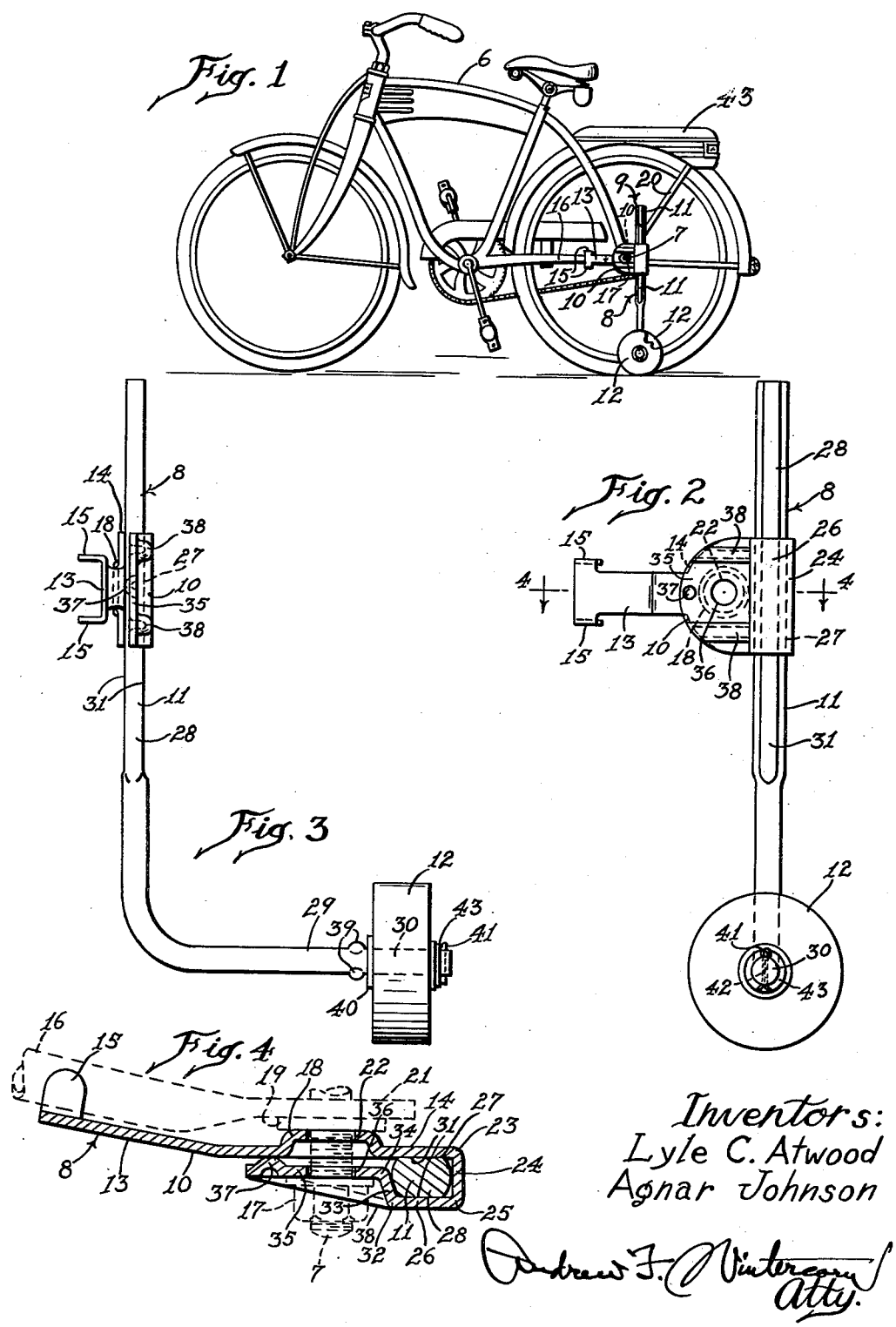
Inventors:
Lyle C. Atwood
Agnar Johnson Patented Nov. 21, 1950

2,530,498

UNITED STATES PATENT OFFICE 2,530,498

BICYCLE STABILIZER

Lyle C. Atwood and Agnar Johnson, Rockford, Ill., assignors to Atwood Vacuum Machine Company, Rockford, Ill., a corporation of Illinois Application May 7, 1949, Serial No. 91,932

3 Claims. (Cl. 280—293)

This invention relates to a new and improved bicycle stabilizer, designed for attachment to the rear axle of a bicycle, to provide lateral support in either direction and thus prevent the bicycle tipping over, whereby to facilitate a child learning to ride a two wheel cycle and to reduce to a minimum likelihood of injury to the child and damage to the bicycle.

The principal object of our invention is to provide a stabilizer attachment that is of such simple and economical construction that it may be readily applied to and later removed from the bicycle and either discarded or given away to some other user, the attachment representing such a small investment. This object is attained by forming each of the attaching brackets and the clamping means for the outboard wheel supporting standard preferably from a single piece of sheet metal stamped and bent to the form desired. A further substantial saving in the cost of production of the attachment is realized by making the two wheel supporting standards separate instead of as integral arms on an inverted U-shaped yoke straddling the back wheel of the bicycle, so that much less rod material is required and a much better appearing attachment is obtained, the rod used in each standard being flattened along its upper end portion to provide facets to enable rigidly clamping the same at different elevations without likelihood of the standard having any tendency to turn, and the lower end portion of the standard being bent outwardly and staked to provide shoulders near the outer end for locating abutment with the outboard wheel working on the outer end portion as an axle.

Another object is to provide an attachment of the kind mentioned which may be easily applied to a bicycle by the owner without the necessity for elaborate instructions, and which includes an adjustment feature enabling quick and easy adjustment as to elevation of the outboard wheels or rollers, in as small steps as may be desired, infinite adjustability being afforded with the present construction, so that as the child progresses in learning to ride the bicycle, these wheels may be moved up higher and higher so as not to be a hindrance.

The invention is illustrated in the accompanying drawing, in which—

Fig. 1 is a side view of a bicycle equipped with a stabilizer made in accordance with our invention, the stabilizer being shown in its lowest adjustment, as for a beginner;

Fig. 2 is a side view of the left hand stabilizer assembly, on a larger scale, and shown removed from the bicycle, the right hand stabilizer assembly for the other side of the bicycle being, of course, the counterpart of this one;

Fig. 3 is a front view of the assembly shown in Fig. 2; and

Fig. 4 is a horizontal section of the line 4—4 of Fig. 2, showing the parts of the stabilizer assembly in full lines, substantially full size, and the bicycle parts in dotted lines, a variation in construction of the bracket being indicated by dot and dash lines in the right hand portion of the section which show where the inner and outer portions of the bracket might be made in separate parts with a space left therebetween corresponding to the space between the two dot and dash lines.

The same reference numerals are applied to corresponding parts throughout the views.

Referring to the drawing, the reference numeral 6 designates a bicycle, on the rear axle 7 of which the stabilizer assemblies of our invention, indicated generally by the reference numerals 8 and 9, are secured, assembly 8 on the left hand side and assembly 9 on the right hand side, the assembly 9 being, of course, the counterpart of assembly 8. Each assembly consists of an attaching and supporting or clamping bracket 10, a standard 11, and an outboard wheel or roller 12. The bracket 10, in accordance with our invention, is stamped and formed from a single piece of sheet metal to provide a torque assuming radius arm 13 reaching forwardly from the main body portion 14 and having inwardly bent lugs 15 at its forward extremity on its upper and lower edges to straddle the horizontal bar 16 of the rear fork associated therewith, and thus positively prevent turning of the bracket as a whole around the axle 7 as a center. The arm 13, as seen in Fig. 4, is bent inwardly at an acute angle with respect to the plane of the main body portion 14 to lie substantially parallel to the side of the fork 16, and the main body portion 14 has a circular embossed portion 18, which projects inwardly therefrom for abutment with the outer face of the eye 19 on the rear fender supporting bracket 20, which, in turn, has abutment with the usual forked extremity 21 on the rear fork of the bicycle frame that receives the axle 7, whereby to space the bracket as a whole outwardly from the frame and fender bracket and avoid interference with the freedom of adjustment of the standard 11. The embossed portion 18 has a hole 22 in the center thereof through which the end portion of the axle 7 is arranged to extend. The body portion 14 is bent at right angles, at 23, to define a vertical end wall 24, and is bent again at right angles, as at 25, to define an outer vertical wall 26 of a vertical guide 27 in which the upper end portion 28 of the standard 11 is slidable for vertical adjustment of the outboard wheel 12. The standard 11 is made of round rod material, so that its outwardly bent lower end portion 29 provides an integral axle portion 30 on the outer end thereof for the wheel 12, and the upper end portion 28 is flattened to the barrel-shaped section illustrated in Fig. 4, the flat opposite sides 31 of which have surface to surface abutment with the inner and outer side walls of the guide 27, as clearly appears in Fig. 4, positively to prevent turning of the standard when the nut 17 is tightened. The outer wall 26 is bent inwardly, as at 32, to define another wall 33 for the guide 27 opposite the end wall 24, this wall 33 being purposely bent at the angle shown in Fig. 4 to lie substantially tangent to the arc of the adjacent side of the flattened upper end portion 28 of the standard 11, more closely to confine the standard in the guide and enable tighter and more rigid clamping. There is another bend at 34 to define the clamping pad portion 35 in spaced parallel relation to the inner wall of the guide 27 and the embossed portion 18, this pad portion having a hole 36 provided therein in register with the hole 22 in the embossed portion 18 through which the axle 7 extends, as shown in Fig. 4. An inwardly embossed projection 37 is provided on the free end portion of the clamping pad portion 35 for abutment with the main body portion 14 when the nut 17 is tightened, whereby to concentrate the clamping pressure between the inner and outer side walls of the guide 27 and accordingly enable tighter and more rigid clamping of the standard 11. Parallel and substantially horizontal reinforcing ribs 38 are embossed outwardly on the clamping pad portion 35, spaced above and below the hole 36 far enough so as not to interfere with the tightening of the nut 17 and reaching substantially the full length of the clamping pad portion from the wall 33 to the free edge of said pad portion, to resist deformation of the clamping pad portion 35 when the nut 17 is tightened excessively. The wheels 12 may be secured on the axles 30 in any suitable or preferred manner. We have shown staked projections 39 provided on the lower horizontal end portion 29 of the standard, which by abutment with a washer 40 serve as shoulders to prevent inward displacement of the wheel from operating position. A cotter pin 41 entered through a hole 42 in the outer end of the axle 30 cooperates with washers 43 to prevent outward displacement of the wheel.

In operation, the nuts 17 are removed from the axle 7 to permit applications of the stabilizer assemblies 8 and 9 to the opposite ends of the axle on opposite sides of the bicycle. Lugs 15 straddle the horizontal bars 16 of the rear fork to prevent turning of the brackets 10 around the axle 7 as a center so that the standards 11 carrying wheels 12 will be quite rigid and the wheels will accordingly be adequately supported to perform the stabilizing function. The nuts 17 are replaced on the opposite ends of the axle and are tightened only after the standards 11 have been adjusted up or down to dispose the wheels 12 on both sides of the bicycle at exactly the desired elevation. After the child has learned to balance the bicycle well enough so that there will be no danger of tipping, the standards 11 can be adjusted a little higher, and, in that way, the wheels 12 will not constitute a hindrance to the freedom of operation of the bicycle, further upward adjustments of the standards being made as further progress is shown. The present construction, involving frictionally clamping the flattened end portions of the standards, is infinitely adjustable, so that the standards may be raised or lowered to exactly the position desired. Eventually, when the child for whom they were purchased has learned to ride without relying upon or needing the protection of the stabilizers, the stabilizer assemblies can be removed and either discarded or presented to someone else, inasmuch as they represent such a small investment. The fact that the assemblies 8 and 9 are separate and independent is of advantage not only from the cost standpoint, but also from the standpoint of better appearance on the bicycle and less inconvenience to the child, especially when there is a rear luggage carrier, like that indicated at 43, over which the upper end portion of an inverted U-shaped yoke would have to extend if the standards were provided as integral arms of such a yoke, as in some prior constructions. In passing, the fact that the rear axle 7 is used for the mounting of the brackets 10 is of great advantage, because it avoids the need for marring the finish on the bicycle frame, and makes double use of the nuts 17 on the axle.

It is believed the foregoing description conveys a good understanding of the objects and advantages of our invention. The appended claims have been drawn to cover all legitimate modifications and adaptations.

We claim:

1. As an article of manufacture, a one-piece sheet metal bracket comprising a main body portion having an elongated radius arm extending from its one end which arm is formed for connection with a bar on one side of a bicycle rear fork, the other end portion of said body portion being bent upon itself so as to define a generally rectangular loop adapted to receive a wheel supporting standard, the free end of the latter end portion being bent to closely spaced parallel relation to the body portion and having a hole provided therein in register with a hole provided in the main body portion adapted to receive the rear axle of the bicycle, one of the closely spaced portions having a projection on that side of the holes away from the loop and spaced from said holes to limit by engagement with the other of said closely spaced portions distortion of the free end portion toward the body portion.

2. As an article of manufacture, a one-piece sheet metal bracket comprising a main body portion having an elongated radius arm extending from its one end which arm is formed for connection with a bar on one side of a bicycle rear fork, the other end portion of said body portion being bent upon itself so as to define a generally rectangular loop adapted to receive a wheel supporting standard, the free end portion of the latter end portion being bent to closely spaced parallel relation to the body portion and having a hole provided therein in register with a hole provided in the main body portion adapted to receive the rear axle of the bicycle, one of the closely spaced portions having a projection on that side of the holes away from the loop and spaced from said holes to limit by engagement with the other of said closely spaced portions distortion of the free end portion toward the body portion, and said free end portion having stiffening ribs provided thereon extending lengthwise thereof in substantially parallel relationship to one another spaced from opposite sides of said registering holes and reaching substantially from the extremity of said free end portion inwardly to the loop portion.

3. As an article of manufacture, a one-piece sheet metal bracket comprising a main body portion having an elongated radius arm extending from its one end, which arm is formed for connection with a bar on one side of a bicycle rear fork, the other end portion of said body portion being bent upon itself so as to define a generally rectangular loop adapted to receive a wheel supporting standard, the free end portion of the latter end portion being bent to closely spaced parallel relation to the body portion and having a hole provided therein in register with a hole provided in the main body portion adapted to receive the rear axle of the bicycle, said free end portion having stiffening ribs provided thereon extending lengthwise thereof in substantially parallel relationship to one another spaced from opposite sides of said registering holes and reaching substantially from the extremity of said free end portion inwardly to the loop portion.

LYLE C. ATWOOD.
AGNAR JOHNSON.

REFERENCES CITED

The following references are of record in the file of this patent:

UNITED STATES PATENTS

| Number | Name | Date |
|---|---|---|
| Re. 22,824 | Morehouse | Dec. 24, 1946 |
| 581,575 | Douglass | Apr. 27 1897 |
| 1,060,014 | Ogden | Apr. 29, 1913 |

FOREIGN PATENTS

| Number | Country | Date |
|---|---|---|
| 21,001 | Great Britain | A. D. 1893 |
| 418,149 | France | Sept. 10, 1910 |
| 437,957 | France | Mar. 2, 1912 |
| 689,864 | France | June 3, 1930 |